(12) United States Patent
Barr et al.

(10) Patent No.: US 7,747,455 B2
(45) Date of Patent: Jun. 29, 2010

(54) PARTNER PROTECTION INSURANCE

(75) Inventors: Cary B. Barr, Bloomington, IL (US); Verona Barr, Bloomington, IL (US)

(73) Assignee: Consilience, Inc., Bloomington, IL (US)

( * ) Notice: Subject to any disclaimer, the term of this patent is extended or adjusted under 35 U.S.C. 154(b) by 1551 days.

(21) Appl. No.: 11/030,660

(22) Filed: Jan. 6, 2005

(65) Prior Publication Data

US 2005/0154619 A1  Jul. 14, 2005

Related U.S. Application Data

(60) Provisional application No. 60/536,414, filed on Jan. 14, 2004.

(51) Int. Cl.
  *G06Q 40/00* (2006.01)
(52) U.S. Cl. .......................................... 705/4
(58) Field of Classification Search ....................... 705/4
  See application file for complete search history.

(56) References Cited

U.S. PATENT DOCUMENTS

| | | |
|---|---|---|
| 6,505,167 B1 | 1/2003 | Horvitz et al. |
| 6,615,181 B1 | 9/2003 | Segal |
| 7,092,936 B1 | 8/2006 | Alonso et al. |
| 7,287,214 B1 | 10/2007 | Jenkins et al. |
| 7,487,041 B2 | 2/2009 | Devries et al. |
| 2002/0082876 A1 | 6/2002 | Martin et al. |
| 2002/0128880 A1* | 9/2002 | Kunikiyo ............... 705/4 |
| 2003/0074231 A1 | 4/2003 | Renes et al. |
| 2003/0200124 A1 | 10/2003 | Kiramittchian et al. |
| 2004/0186751 A1 | 9/2004 | Colavito et al. |
| 2004/0193444 A1 | 9/2004 | Hufford et al. |
| 2004/0267593 A1 | 12/2004 | Sammons et al. |
| 2005/0144045 A1 | 6/2005 | Corsi |

OTHER PUBLICATIONS

*Texas Farmers Ins. Co. v. Murphy*, 996 S.W.2d 873 (Tex. 1999) (Murphy).*

Prenuptial agreements First you say you will, then you won't . . . , [ALL Edition] Chris Pope. Telegram & Gazette. Worcester, Mass.: Mar. 11, 1990. p. F.6.*

(Quinn) Michael Sean Quinn & Andrea D. Levin, Directors' and Officers' Liability Insurance: Probable Directions in Texs Law, 20 Rev. Litig. 381 (2001).*

(CNA) Member Companies of CNA Insurance. The Professional Liability Policy for Design Professionals. Copywright 1998. [online] [retrieved on Oct. 20, 2009] Retrieved fromthe Internet: <URL: http://www.schinnerer.com/industries/design-firms/Documents/PolicyForms/AEC-1999%20NY%20Policy.pdf>.*

(Continued)

*Primary Examiner*—Stefanos Karmis
*Assistant Examiner*—Thuan Tran
(74) *Attorney, Agent, or Firm*—Mark Nowotarski

(57) ABSTRACT

Partner protection insurance provides coverage for an innocent spouse in the event that a defendant has to pay damages uninsured by a liability insurance policy to a plaintiff due to a judgment in a lawsuit brought by the plaintiff against the defendant. The innocent partner is in a partnership with the defendant. Partner protection insurance covers the joint assets of the partnership that are assignable to the innocent partner in the event of the dissolution of said partnership. The partnership may be a marriage.

8 Claims, 13 Drawing Sheets

OTHER PUBLICATIONS (Nodaway) *Nodaway Valley Bank* v. *Continental Cas. Co.* 916 F2d 1362.*

(Kurens) Jonathan H. Kurens. Management Liability: D&O for Law Firms. County Bar Update, Dec. 2003, vol. 23, No. 11.*

(Krause) Jason Krause. Netting Information. ABA Journal. Chicago: Mar. 2003. vol. 89 p. 36, 5 pgs.*

Nadia Startari, "Association Libility Insurance Policy", AON, Underwritten By CGU, Royal & Sunalliance, Australia, Mar. 28, 2003.

"*Albert C. Beaver, Jr., Plaintiff-Appellee,* v. *Country Mutual*" Appellate Court of Illinois, Fifth District 95 Ill. App. 3d 1122; 420 N.E.2d 1058; 1981 Ill. App. Lexis 2572; 51 Ill. Dec. 500 Apr. 20, 1981.

Family Law Software, Inc, "Family Law Professional Software For Financial Planners . . .", Last Update Oct. 25, 2004, http://www.split-up.com/products(last viewed Dec. 1, 2004).

Family Law Software, Inc, "Family Law Software Planner—Professional Edition . . . ", Last Update Nov. 23, 2004, http://www.split-up-com/products (last viewed Dec. 1, 2004).

Family Law Software, Inc, "Online—Property Division Calculator", Last Update Oct. 25, 2004, http://www.split-up-com/products (last viewed Dec. 1, 2004).

Lakshmi Chaudhry, "Splitting Up? Get Software", Wired News, May 9, 2000, http://www.split-up.com/newreport/00-05-09_Wired-News(last viewed Nov. 3, 2004).

CNA Pro, "Epack -a dynamic innovation in business liablity protection", CNA Financial Corporation, Sep. 5, 2000.

"*Mongold, Exr., et al.* v. *Estate of Gilbert et al.* " No. CVC980279 Court of Common Pleas of Brown County, Ohio, 114 Ohio Misc. 2d 32; 758 N.E.2d 1245; 2000 Ohio Misc., Lexis 66, Dec. 14, 2000.

"Directors & Officers Coverage", The SCPIE Companies http://www.scpie.com/common/scripts/print_ (last viewed Oct. 21, 2004).

The Law Society Of Albert Benchers' Advisory, Issue 51 Calgary, Alberta, Canada, Aug. 1997.

The Law Society of Bristish Columbia, Newsletter Benchers' Bulletin No. 2 Mar.-Apr., Vancouver, BC, Canada, 1995.

The Law Society Of Newfoundland, Newsletter, Bencher's Notes vol. 7 No. 4, St. John's, Newfoundland Canada, Dec. 2001.

Insurance Template, Brotherhood Mutual Insuance Company, Mar. 15, 2004.

The Law Society of New South Wales, Newsletter, Sydney Australia, Apr. 1998.

*Robert R. Murphy and Daisy Murphy, appellants,* v. *Texas Farmers Insurance Company, appelle.*(Tex. App) Court of Appeals of Texas, Houston (1$^{st}$ Dist.) May 27, 1998.

* cited by examiner

Partner Protection Liability Declarations

Policy Number _____

Partner Protection Insurance Company _____, Broker

Insured – 'Partners' of all the employees of _____

Mailing Address _____

_____

Policy Period – Runs From _____ To _____

This policy, and all of its terms and conditions, will become effective upon payment of the agreed premium.

Limits of Insurance – For each insured the aggregate amount that is available is based upon their proportion of partnership assets as determined by the laws governing dissolution of partnership in their state of domicile. In no event will that amount exceed $_____.

This is an occurrence policy. All occurrences must have occurred during the policy period.

Premium Charged -- $_____ X (Number of employee partners of entity) X 12 Months

= $_____ premium per year. This is an annual policy.

Authorized Company Representative _____ Date _____

Fig. 3A

Policy Form

Introduction

This insurance is provided to offset, to the extent as defined in the terms and conditions of the policy, the adverse impact of *punitive or exemplary damages* awarded against the *current family member* of an *insured*. The *insured* will also receive the services of legal representation during the proceedings where the *insured's* assets are at risk through payment, by their *current family member* of a punitive damage award. Risk management will be provided for an additional fee.

Coverage Agreement:

The plan agrees to indemnify the *insured* against all *loss* incurred by the *insured* and only the *insured* as a result of payment by a *current family member* in satisfaction of a *judgment* for *punitive or exemplary damages*. The plan agrees to pay to the *insured* all sums owed by the *insured*, and only the *insured*, as soon as the *insured* becomes liable therefor, whether or not the *insured* shall have paid out such sums or any part thereof.

In addition, the plan agrees to represent the *insured's* interest in any proceeding in which a *current family member* is at risk for payment of *punitive or exemplary damages*.

Definitions:

*Insured* – The named *insured* shown in the declarations and their son or daughter, while living with the *insured* at their principal place of residence.

*Current family member* – Spouse, life partner or continuously uninterrupted cohabiting individual who jointly owns assets with the *insured*.

*Judgment* – Any formal court or administrative adjudication that exposes an *insured's* assets to payment in satisfaction of a punitive damage award in support of that adjudication.

Fig. 3B

*Punitive or Exemplary Damages* – Those damages assessed against the *current family member* to punish and/or deter the *current family member* from certain *actions* or omissions.

*You & Your* – The words *you and your* refer to the *insured* stated on the declarations page.

*Our, Us & We* – The words *our, us & we* refer to Partner Protection Plan.

*Limits of Liability* – The Applicable Limit of Liability that is described in the *Limits of liability* Section of the Declarations Page.

*Action* – Any formal court or administrative proceeding in which an *insured's* assets would be exposed through an award of *punitive or exemplary damages* against a *current family member*.

*Loss* – Detriment or disadvantage resulting from deprivation or change of conditions as a result of a *judgment* of *punitive or exemplary damages* assessed against a *current family member*.

*Occurrence* – An event, including continuous or repeated exposure to substantially the same general harmful conditions. Two or more *related* events shall be considered one *occurrence*.

*Related* - Connected or associated
    a. by being a part of a course of conduct or an operation, or
    b. by having, being caused by, resulting from or arising out of common or similar ordinances, resolutions, policies or procedures.
    c. All events alleged by plaintiffs certified as or otherwise determined by a court to be members of a class that have filed a class action shall be considered to be *related*. The events alleged in the class *action* shall continue to be considered to be *related*, notwithstanding, without implied limitation,
        1. the election by one or more class plaintiffs or potential class plaintiffs to not participate in a class that has been or later becomes certified or to opt out of such a class,
        2. the failure for any reason of the class *action* to include or name persons or organizations who were or may have been injured of have suffered damage to their property as a result of the same or similar events, or

Fig. 3C 3. the filing of other claims or suits with respect to the same or similar events.
d. without implied limitation, all violations of civil, human or constitutional rights, which result or are alleged to result from, or arise out of
   1. the same or similar policies or procedures
   2. the failure to enforce the same or similar policies or procedures, or
   3. the same or similar lack of lawful policies or procedures shall be considered to be related.

General Conditions:

1. Bankruptcy.
   *Our* obligations to the *insured* under this Coverage will not be relieved by the insolvency or bankruptcy of the *insured*.

2. Duties of the *Insured* in the Event of a Claim.
   a. As soon as possible, advise *us* of any *action* for which *you* seek coverage.
   b. Authorize *us* to obtain records and information concerning the *action*.
   c. Cooperate fully with *us* during the investigation of the claim
   d. Assist *us* with any settlement.

3. Disputes between *You* & *Us*.
   a. Either party has a right, at their own expense, to bring a legal *action* against the other. Should the dispute be based on the interpretation of the contract, it shall be submitted to mediation prior to filing of a lawsuit. If the dispute was not submitted to mediation, the lawsuit will be subject to dismissal for failure to meet a condition prerequisite. All disputes shall be submitted to the American Arbitration Association for non-binding mediation.
   b. Allocation of Costs – If other insurance also covers the *loss*, we will pay only *our* share. *Our* share is the proportion that *our* limit of liability bears to the total of all applicable limits.

4. Jurisdiction and Venue

Fig. 3D

This coverage applies only to the adverse affects on the *insured* of payment of *punitive or exemplary damages* by a *current family member* in United States Federal District Court or any of the 50 State Courts of the United States.

Exclusions:

This coverage does not apply if *you* are a named defendant in the same proceeding as the *current family member* for which *you* are seeking coverage.

Additional Payments:

In addition to the *limits of liability* stated on the declarations page, we will pay:
1) all expenses we incur and all costs associated with representing the *insured* under the terms and conditions of this policy.
2) Reasonable expenses an *insured* incurs for attending hearings or trials at *our* request. We will also pay an *insured*, with proof, their actual lost wages.

Fig. 3E

602 → [NAME OF COUNSEL FOR INNOCENT PARTNER], [NAME OF LAW FIRM OF COUNSEL FOR INNOCENT PARTNER], [ADDRESS OF COUNSEL FOR INNOCENT PARTNER], [LOGO FOR LAW FIRM OF COUNSEL FOR INNOCENT PARTNER]

[DATE]

[NAME OF COUNSEL FOR DEFENDANT], [NAME OF LAW FIRM OF COUNSEL FOR DEFENDANT], [ADDRESS OF COUNSEL FOR DEFENDANT]

Re: Settlement of [CASE NAME], [COURT NAME], [CASE NUMBER]

Dear Sir or Madam:

604 → I represent [NAME OF INNOCENT PARTNER], [RELATIONSHIP OF INNOCENT PARTNER TO DEFENDANT] of [NAME OF DEFENDANT], your client. The plaintiff, [NAME OF PLAINTIFF] is seeking punitive damages, which, if awarded, will adversely affect assets of my client.

My firm will be filing its appearance with the court in a timely fashion. Your service list should include my firm. Any and all demands for settlement from plaintiff(s) or co-defendant(s) should be promptly forwarded to my attention.

As my client is innocent of any wrongdoing, we anticipate you winning or settling this case with no adverse affect to (her, his) assets.

Sincerely,

606 → [SIGNATURE OF COUNSEL FOR INNOCENT PARTNER]

[NAME OF COUNSEL FOR INNOCENT PARTNER]

Fig. 6

702 → [NAME OF COUNSEL FOR INNOCENT PARTNER], [NAME OF LAW FIRM OF COUNSEL FOR INNOCENT PARTNER], [ADDRESS OF COUNSEL FOR INNOCENT PARTNER], [LOGO OF LAW FIRM OF COUNSEL FOR INNOCENT PARTNER]

[DATE]

[NAME OF COUNSEL FOR DEFENDANT], [NAME OF LAW FIRM OF COUNSEL FOR DEFENDANT], [ADDRESS OF COUNSEL FOR DEFENDANT]

Re: Settlement of [CASE NAME, COURT NAME, CASE NUMBER]

Dear Sir or Madam:

704 → We have received the demand to settle from Plaintiff's counsel today. We seek your good faith efforts in handling of this matter as stated in the [RELEVANT PRECEDENT] case. Therefore we demand that you accept the plaintiff's offer or, in the alternative, commence negotiations, which will conclude this matter sufficiently to protect my client's assets.

Please advise me of your progress.

Sincerely,

706 → [SIGNATURE OF COUNSEL FOR INNOCENT PARTNER]

[NAME OF COUNSEL FOR INNOCENT PARTNER]

Fig. 7

802 → [NAME OF COUNSEL FOR INNOCENT PARTNER], [NAME OF LAW FIRM OF COUNSEL FOR INNOCENT PARTNER], [ADDRESS OF COUNSEL FOR INNOCENT PARTNER], [LOGO OF LAW FIRM OF COUNSEL FOR INNOCENT PARTNER]

[DATE]

[NAME OF COUNSEL FOR DEFENDANT], [NAME OF LAW FIRM OF COUNSEL FOR DEFENDANT], [ADDRESS OF COUNSEL FOR DEFENDANT]

Re: Judgment of [CASE NAME, COURT NAME, CASE NUMBER]

Dear Sir or Madam:

804 → We have received the judgment in case [CASE NUMBER]. We seek your good faith efforts in settling this case prior to the deadline for submission of a notice of appeal as stated in the [RELEVANT PRECEDENT] case. Therefore we demand that you accept the plaintiff's most recent offer or, in the alternative, commence negotiations, which will conclude this matter sufficiently to protect my client's assets.

Please advise me of your progress.

Sincerely,

806 → [SIGNATURE OF COUNSEL FOR INNOCENT PARTNER]

[NAME OF COUNSEL FOR INNOCENT PARTNER]

Fig. 8

PARTNER PROTECTION INSURANCE

CROSS REFERENCE TO RELATED APPLICATION

This application claims the benefit of U.S. provisional patent application Ser. No. 60/536,414, filed Jan. 14, 2004, and entitled "Partner Protection Plan Insurance Policy". Said provisional application is incorporated herein by reference.

FIELD OF THE INVENTION

The invention is in the field of insurance.

BACKGROUND

Refer to FIG. 1 unless otherwise indicated. FIG. 1 illustrates the relationship between parties involved in a civil lawsuit.

One purpose of a civil lawsuit is for a first party to recover damages they have suffered due to the actions or negligence of a second party. The first party is referred to herein as the "plaintiff" 102. The second party is referred to herein as the "defendant" 104. A given civil case is tried before a given court 106 that has jurisdiction over the case. Exemplary courts in the United States include State Courts and Federal Courts. The decisions handed down by said courts are reviewable by their respective appeals courts.

Both the plaintiff and the defendant are normally represented by their own counsels. The counsel 122 for the plaintiff seeks to represent the interests 132 of the plaintiff. The counsel 124 for the defendant seeks to represent the interests 134 of the defendant.

Solid head arrows (e.g. items 132 and 134) in FIGS. 1 and 2 of the present invention represent the conveying of the interests of a first party to a second party. The size of the head of the arrow gives some indication of the relative influence of the first party on the actions of the second party.

The plaintiff seeks to recover damages 160 from the assets 110 of the defendant.

Double open head arrows (e.g. items 160 and 170) in FIGS. 1 and 2 of the present invention represent monetary amounts. Longer arrows represent larger money amounts.

The assets of the defendant may include limits of coverage 112 provided by at least one liability insurance policy, personal assets 114 of the defendant and joint assets 116 co-owned by at least one other partner 108 of the defendant.

Said at least one other partner, for example, might be the spouse, domestic partner or family member of the defendant. Said joint assets would then be the assets jointly owned by the defendant and their spouse, domestic partner or family member.

Said at least one partner might be one or more business partners of the defendant. Said assets might be the assets of said business partnership.

The damages 160 sought by the plaintiff can be divided into a first portion 162 and a second portion 164. The first portion are those damages that are covered by the limits of liability 112 of said at least one liability insurance policy covering the defendant. Said first portion is referred to herein as the "insured damages". The second portion are those damages that are not covered by said at least one liability insurance policy. Said second portion is referred to herein as "uninsured damages".

Insured damages might include compensatory damages incurred by the plaintiff. These might include medical bills incurred by the plaintiff due to injury caused by the defendant.

Uninsured damages might include punitive damages assessed on the defendant. These might include punitive damages assessed on the defendant because the defendant violated one or more of the civil rights of the plaintiff.

It is common during a civil lawsuit for both the defendant and the plaintiff to negotiate to settle the case. Negotiations are commonly carried out by the counsel for the defendant and the counsel for the plaintiff. During said negotiation, the counsel for the defendant might make a first offer for settlement 170. The counsel for the defendant might respond with a counteroffer 180. If either of these offers are acceptable to the other party, then a settlement has been reached and, pending approval of the court 106, the case is dismissed. If neither offer is acceptable, then the case proceeds. Additional offers and counteroffers may be made during the course of the case.

Settlement may be difficult to obtain when the amount of uninsured damages 164 sought by the plaintiff is large compared to the amount of insured damages 162 sought by the plaintiff. This is due to the fact that when the defendant is covered by at least one liability insurance policy, the counsel for the defendant often acts at least in part in the interests 133 of the liability insurance company 103 providing said at least one liability insurance policy. The liability insurance company is unlikely to allow the counsel for the defendant to settle the case for more than said liability insurance company's maximum exposure, which is the insured damages 162. The plaintiff, however, is unlikely to settle the case for an amount significantly less than the combined insured and uninsured damages, particularly if the plaintiffs case is strong.

Hence in cases where the uninsured damages are large compared to the insured damages, said cases often proceed to a judgment by the courts.

Once a court renders a judgment on damages, the liability insurance company is liable for the insured damages and the defendant is liable for the uninsured damages. The defendant and the liability insurance company each pay their respective liabilities to the plaintiff, assuming that the judgment is not appealed.

Uninsured damages will be paid by the defendant from the personal assets 114 of said defendant and, if necessary, the joint assets 116 co-owned with said at least one partner 108. Consequently said at least one partner will suffer due to the judgment against the defendant. We refer to said at least one partner as an "innocent partner" since said at least one partner was not legally responsible for the damages suffered by the plaintiff but still had to pay part of them from their share of the joint assets 116.

Hence there is a need for an improved means to protect the interests of innocent partners.

SUMMARY OF THE INVENTION

The Summary of the Invention is provided as a guide to understanding the invention. It does not necessarily describe the most generic embodiment of the invention or all species of the invention disclosed herein.

All numerical calculations described herein may be performed by one or more information systems where said information systems comprise a computer, an input device, an output device and any other known hardware or known software suitable for computing or telecommunications systems.

Partner protection insurance provides coverage for an innocent spouse in the event that a defendant has to pay uninsured damages to a plaintiff due to a judgment in a lawsuit brought by the plaintiff against the defendant. The innocent partner is in a partnership with the defendant. Partner protection insurance covers the joint assets of the partnership that are assignable to the innocent partner in the event of the dissolution of said partnership. The partnership may be a marriage.

A suitable method for marketing partner protection insurance comprises the steps of:
 a) identifying one or more classes of potential defendants and their potential innocent partners;
 b) estimating the potential total premium that a given one of said classes might pay for said insurance; and
 c) comparing said potential total premium to a threshold value; wherein:
  i. said threshold value is a minimum total premium required to sell said insurance to said given one of said classes; and
  ii. at least a portion of one or more of said steps is at least in part performed by one or more information systems.

A suitable method for selling partner protection insurance comprises the steps of:
 a) identifying a suitable class of potential defendants and their partners;
 b) obtaining personal information regarding members of said suitable class;
 c) offering to sell said insurance to one or more members of said class;
 d) obtaining application information from one or more members of said class;
 e) approving said sale of said insurance if said application information meets a predetermined set of criteria; and
 f) closing said sale of said insurance, wherein at least a portion of one or more of said steps is at least in part performed by one or more information systems.

A suitable method for representing the interests of an innocent partner during a lawsuit, comprises the steps of:
 a. receiving notification from said innocent partner that said lawsuit has been filed against a defendant, said defendant being a partner of said innocent partner;
 b. providing counsel for said innocent partner; and
 c. providing one or more demand letters to said counsel for said innocent partner such that said counsel for said innocent partner may serve said one or more demand letters upon a counsel for said defendant, wherein at least a portion of one or more of said steps is at least in part performed by one or more information systems.

A suitable method for determining a benefit payable to an innocent partner insured by a partner protection insurance policy, said innocent partner being in a partnership with a defendant, said defendant having to pay uninsured damages to a plaintiff, comprises the steps of:
 a) determining an amount of said uninsured damages payable from the joint assets of said partnership;
 b) determining a fraction of said joint assets assignable to said innocent partner in the event of the dissolution of said partnership; and
 c) calculating said benefit by multiplying said amount of said uninsured damages payable from said joint assets by said fraction, wherein at least a portion of one or more of said steps is at least in part performed by one or more information systems.

BRIEF DESCRIPTION OF THE DRAWINGS

FIG. 3 consists of FIGS. 3A, 3B, 3C, 3D and 3E. FIGS. 3A, 3B, 3C, 3D and 3E are the sequential pages of an exemplary partner protection insurance policy.

FIG. 6 is an exemplary demand letter.

FIG. 7 is an alternative exemplary demand letter.

FIG. 8 is another alternative exemplary demand letter.

DETAILED DESCRIPTION

The following detailed description discloses various embodiments and features of the invention. These embodiments and features are meant to be exemplary and not limiting.

Partner Protection Insurance

The present invention comprises a method and apparatus for providing an inventive form of insurance referred to herein as "partner protection" insurance. Partner protection insurance protects the financial interests of innocent partners.

Figure 1:
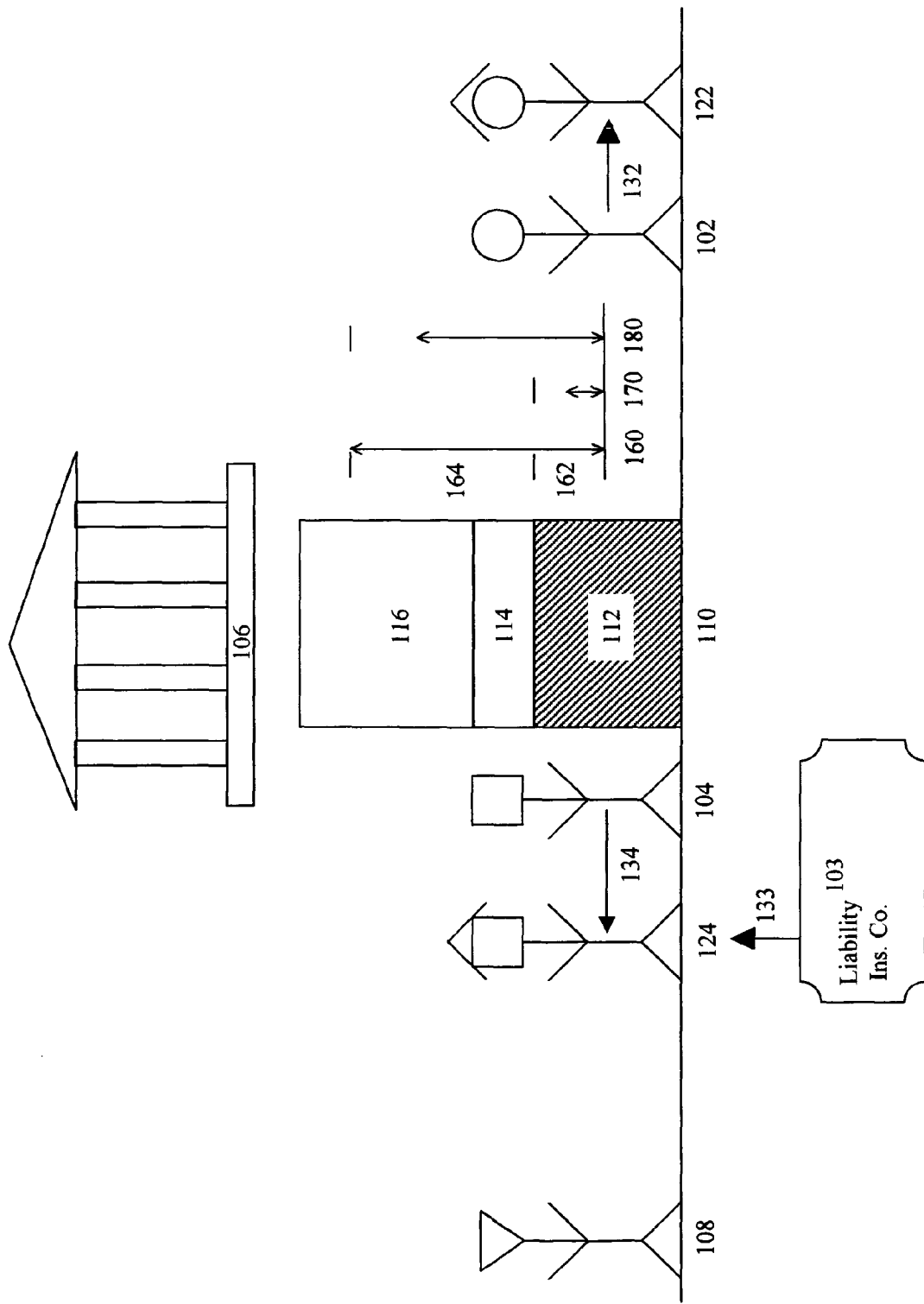
FIG. 1 is an illustration of the prior art method of settling a lawsuit between a plaintiff and a defendant where the defendant has an innocent partner that is not covered by partner protection insurance.
Figure 2:
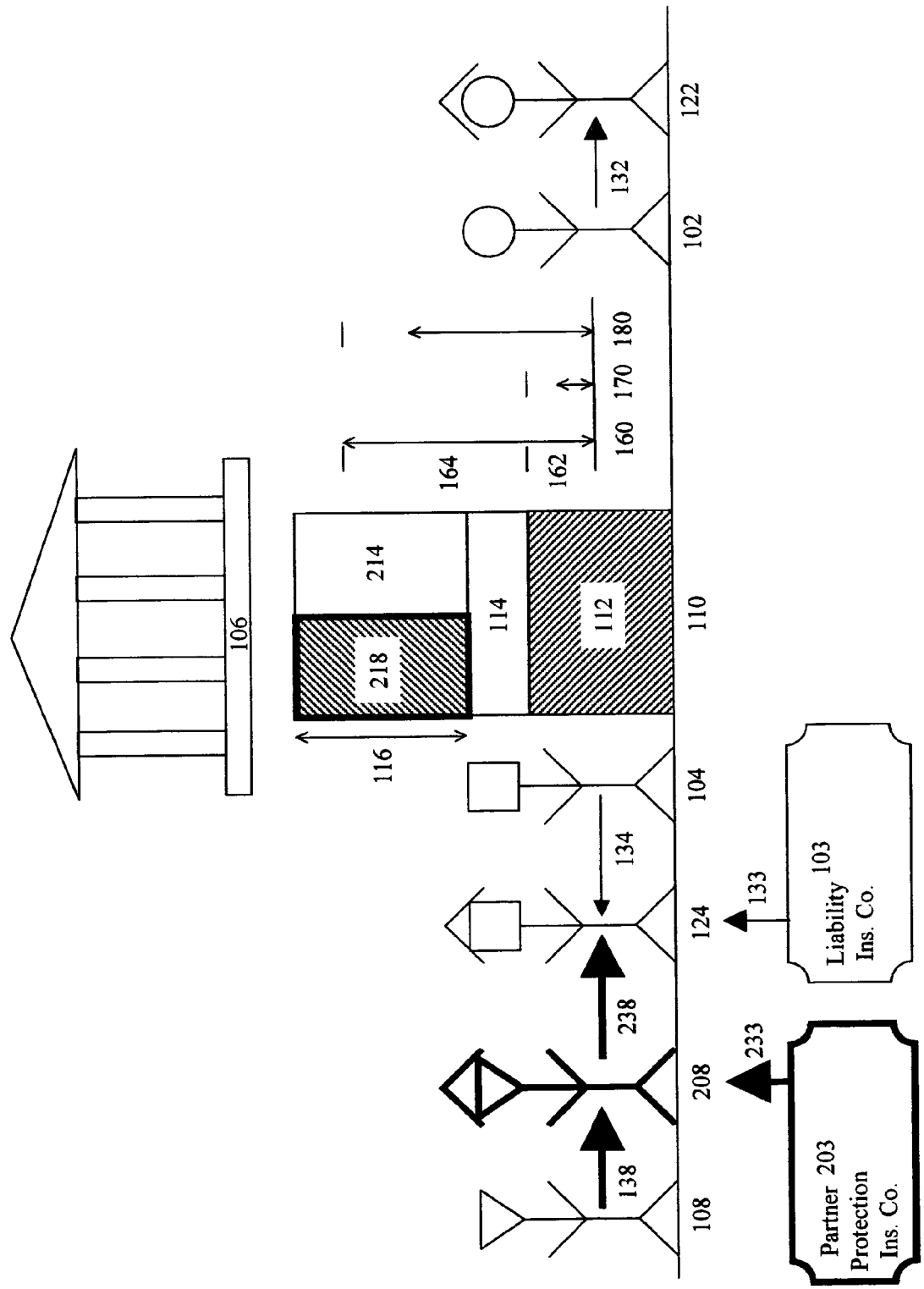
FIG. 2 is an illustration of a method for settling a lawsuit between a plaintiff and a defendant where the defendant has an innocent partner that is covered by a partner protection insurance policy.

Refer to FIG. 2 unless otherwise specified. FIG. 2 is similar to FIG. 1 except that FIG. 2 further illustrates the relationship between parties involved in a civil lawsuit when an innocent partner 108 is covered by partner protection insurance.

Partner protection insurance is provided by partner protection insurance company 203. Preferably, partner protection insurance company 203 is different than liability insurance company 103. The interests of a given partner protection insurance company will be different and potentially in conflict with the interests of a given liability insurance company in a given civil lawsuit. A single company may offer both partner protection insurance and liability insurance to members of different partnerships, but due to said potential conflict of interest, they should not offer partner protection insurance and liability insurance to different members of the same partnership.

A partner protection insurance policy offers coverage for the fraction 218 of the joint assets 116 of a partnership wherein said fraction is assignable to the innocent partner 108. If a judgment is rendered against a defendant for uninsured damages 164, then the partner protection insurance company will reimburse the innocent partner for said fraction of said damages that is paid to the plaintiff in order to satisfy said judgment. Hence the innocent partner will not suffer monetary damages due to the judgment against said defendant.

Said fraction of damages may be specified in said partner protection plan insurance policy. If the partnership is a marriage, for example, said fraction of damages may be in the range of between 40% and 60%. Said fraction of damages may preferably be in the range of 45% to 55%. Said fraction of damages may more preferably be about 50%.

As used herein, the term "about" means within 5% of a given value. 5% of 50% is 2.5%. Hence "about 50%" means 47.5% to 52.5%.

In certain special circumstances, said fraction of damages may be greater than 60% or less than 40% when the partnership is a marriage. Said special circumstances might include cases where a prenuptial agreement exists which specifies ownership of joint assets at a percentage greater than 60% or less then 40%.

Said fraction of damages should be chosen to minimize moral hazard. Moral hazard might occur if the fraction of damages were large enough such that the portion 214 of the joint assets attributable to a defendant 104 were insured at least in part by a partner protection insurance policy. Punitive damages are designed to punish a defendant. If a portion 214 of the joint assets assignable to the defendant were covered at least in part by a partner protection insurance policy, then the defendant would be shielded from the punitive nature of the damages. This would be unacceptable to most governmental insurance departments whose approval would be required to sell partner protection insurance in a given jurisdiction.

Moral hazard can be reduced if said fraction of damages is no more than the fraction of joint assets that would be assigned to an innocent partner should a partnership be ended. For partnerships that are marriages governed by the laws of the various States of the United States, for example, most courts adjudicating the assignment of assets in the event of the ending of said partnership would accept assignment of joint assets to either partner in the range of 40 to 60 percent of said joint assets. Said fraction of damages, therefore, may be in the range of 40 to 60 percent.

A partner protection insurance company may determine if a fraction of damages greater than 60% or less than 40% is suitable for a given innocent insured in a partnership by examining the laws and legal precedent of the jurisdiction governing the dissolution of said partnership. For example, if a partnership is governed by the State of Illinois, said laws include the Illinois Marriage & Dissolution of Marriage Act, 750 ILCS 5/, Uniform Partnership Act, 805 ILCS 205/, and the Dissolution of Corporations Act, 805 ILCS 20/. Each of these statutes as of Jan. 14, 2004 is incorporated herein by reference.

A partner protection insurance policy may provide for counsel 208 to represent the interests 138 of an innocent partner in the event of a civil lawsuit against a defendant. Said counsel will also represent the interests 233 of the partner protection insurance company providing said policy.

The duties of said counsel 208 for said innocent partner 108 will comprise representing the combined interests 238 of the innocent partner and partner protection insurance company to the counsel 124 for the defendant. It is anticipated that this conveyance of interest will increase the likelihood that the plaintiff and the defendant will settle a given civil case.

A partner protection plan insurance policy may also provide for financial counseling for a given partnership to minimize their exposure to uninsured damages.

An exemplary partner protection insurance policy is illustrated in FIGS. 3A, 3B, 3C, 3D and 3E. These Figures are to be read in order. Text in square boxes in said Figures are labels and do not form part of the invention.

Marketing Partner Protection Insurance

Figure 4:
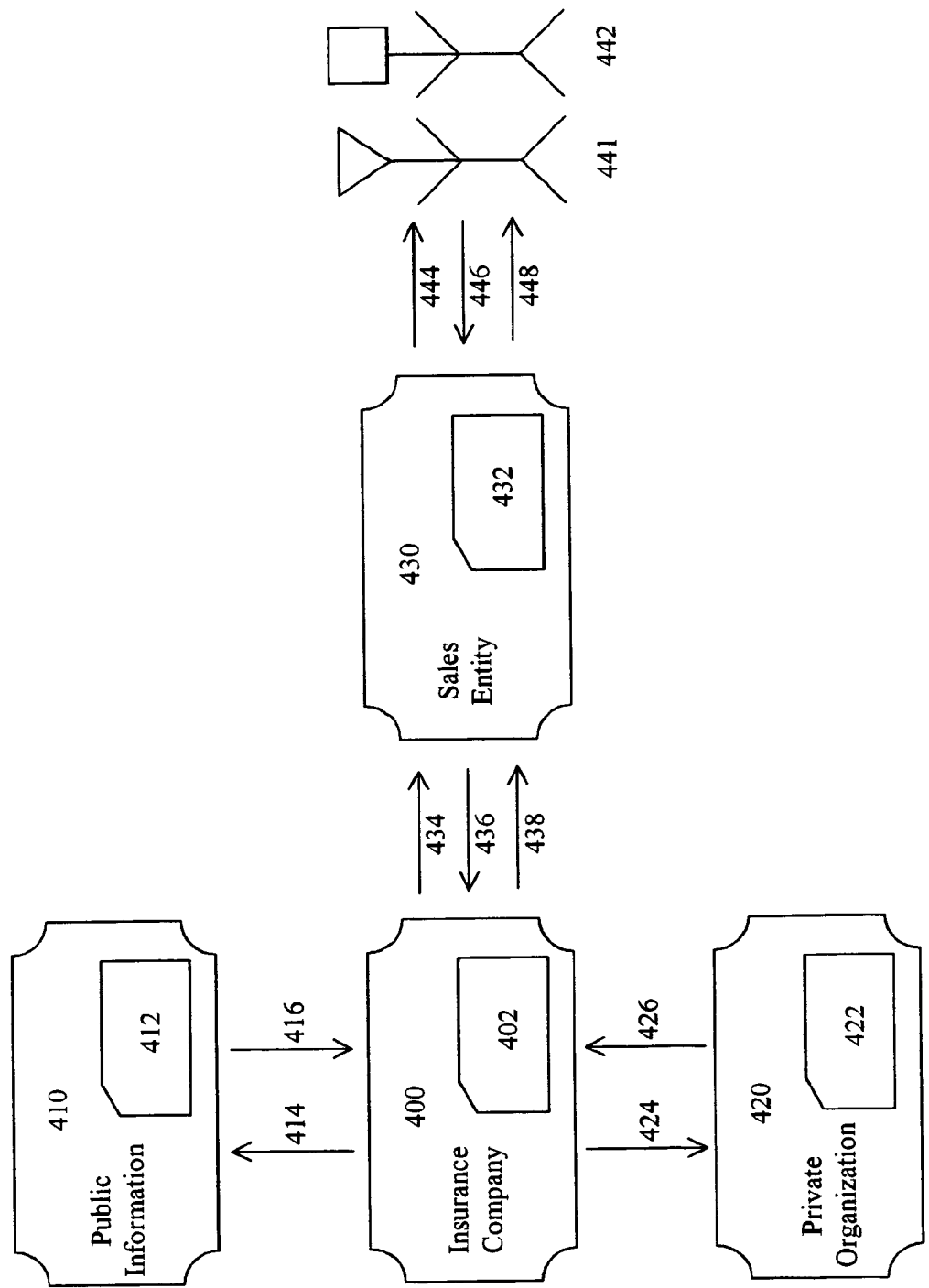
FIG. 4 is an illustration of a method for marketing partner protection insurance and a method for selling partner protection insurance.

Refer to FIG. 4 unless otherwise indicated.

"Marketing partner protection insurance" refers to the process of identifying and determining if a given class of potential defendants and their respective partners is large enough to warrant a specific program to sell partner protection plan insurance to them. If said given class is large enough it is referred to herein as a "suitable class".

FIG. 4 illustrates process and equipment suitable for the marketing of partner protection insurance policies.

Open head arrows in FIG. 4 represent information flow. Said information may be digitally encoded and transferred over a telecommunications network, such as the Internet. Said information may be protected by cryptography and other security measures. Said information may be transferred directly from one information system to another.

An information system may comprise a computer, data storage means, software for operating said computer and input/output devices. Said input/output devices may comprise telecommunications means. Known information systems may be suitable for carrying out the various means described herein.

Certain classes of people have a higher than average probability of being sued for uninsured damages. Law enforcement officers, for example, are sued at about a rate of 1% per year for alleged punitive damages. Law enforcement officers include police officers and prison security personnel. About 90% of these cases do not result in punitive damages. The 10% that do result in punitive damages, however, have an average punitive damage award of $100,000. If the defendant in a case has an innocent partner, then the innocent partner can wind up paying for about half of the damage award.

Other classes of people that have a higher than average probability for being sued for uninsured damages include municipal employees, such as teachers; and professionals, such as doctors, lawyers and accountants.

We refer to said classes of people as "potential defendants". We refer to the partners of said potential defendants as "potential innocent partners".

A suitable method for marketing partner protection insurance comprises the steps of:
1. identifying one or more classes of potential defendants and their potential innocent partners;
2. estimating the potential total premium that a given one of said classes might pay for said insurance; and
3. comparing said potential total premium to a threshold value; wherein:
    i. said threshold value is a minimum total premium required to sell said insurance to said given one of said classes; and
    ii. at least a portion of one or more of said steps is carried out at least in part by one or more information systems.

1. Identifying Classes of Potential Defendants

Referring to FIG. 4, an insurance company 400 offering partner protection insurance can identify classes of potential defendants by querying 414 publicly available information 410. Said information may be manually available, such as books in a library. Said information may also be available from one or more public computer information systems 412 via a telecommunications system, such as the Internet.

Said public computer information systems may comprise databases. Said information systems may be freely available, such as the Statistical Abstract of the United States (http://www.census.gov/statab/www/ last viewed Dec. 13, 2004) or may require payment for access, such as Dialog® (www.dialog.com last viewed Dec. 13, 2004) (Dialog® is a trademark of The Thomson Corporation, Toronto Ontario Canada).

Said queries may be transmitted over the Internet or other suitable technology means. Said insurance company may employ search engines, such as Google® (www.google.com last viewed Dec. 13, 2004) (Google® is a trademark of Google, Inc. of Mountain View, Calif.) to identify sources of information.

In response to said queries, said insurance company will receive public class data 416 indicating the suitability of various classes of people for partner protection insurance. Said public class data may comprise damage awards data. Said damage awards data may comprise the frequency of civil lawsuits brought against members of a given class of people or other entities, awards for uninsured damages, and reasons for awards. Said damage awards data may be categorized according to when said suits were initiated and when said damages were assessed. Data on damage awards is available from VerdictSearch® (www.juryverdict.com last viewed Dec. 14, 2004) (VerdictSearch® is a trademark of American Lawyer Media, Inc. of NY, N.Y.)

Public class data 416 may also comprise demographic data regarding said given class of people. Said demographic data may comprise the average income of said class, the distribution of incomes for said class, the average assets of said class, the total number of people in said class and the fraction of said class that belong to a partnership such as marriage.

A class of people is considered to be at risk of civil litigation comprising uninsured damages if the annual frequency of said litigation is greater than 0.1% of the population of said group. As indicated above, for example, law enforcement officers have a frequency of said litigation of about 1% per year and are therefore at risk of civil litigation.

2. Estimate Potential Premium for a Given Class

The required premiums for the potential innocent partners of a given class of potential defendants can be estimated by dividing the anticipated claims by a suitable loss ratio. The anticipated claims can be calculated by multiplying the fraction of a given class that will purchase said insurance by the total number in the class and the average required premium per potential innocent partner of a typical member of the class.

For law enforcement officers, the anticipated annual claims per insured potential innocent partner, such as a spouse, is $100. This is based on an anticipated cost per claim of $10,000 and a claim rate of 1% per year per insured potential innocent partner. The 1% per year claim rate is based on the 1% per year civil litigation frequency of law enforcement officers.

The $10,000 cost per claim is based on an average of $5,000 paid in benefits to a given innocent partner per civil litigation, $3,000 in attorney's fees for counsel for said innocent partner, $1,000 in fees for financial counseling of said innocent partner and $1,000 for incidental expenses related to a claim.

Said annual claims per insured of $100 can be divided by a loss ratio to give an average premium per insured. Said loss ratio may be in the range of 50% to 70%. Said division yields a suitable average premium for partner protection insurance for the potential innocent partners of law enforcement officers of $140 to $200 per year.

A "loss ratio" is the fraction of premiums required to pay claims against a given insurance coverage. The balance of a premium that is not used to pay claims is used to pay sales, administrative, profit, reserve and other expenses.

There are approximately 2,000,000 law enforcement officers in the United States as of 2004. If the potential innocent partners of 10% of these law enforcement officers purchased partner protection insurance, then the total premium income would be in the range of $28 million to $40 million per year.

3. Compare Potential Premium to Threshold Premium

A suitable threshold premium for determining if a class of potential defendants and their potential insured partners is suitable for selling partner protection plan insurance to is $1 million dollars per year.

Hence law enforcement officers and their partners is a suitable class to sell to.

If several classes of potential defendants are found that do not have a potential premium that exceeds the threshold, then they may be grouped into a generic class of potential insureds and offered a generic version of partner protection insurance.

Selling Partner Protection Insurance

"Selling partner protection insurance" refers to the process for offering to sell partner protection insurance to a given class of potential defendants and their partners insurance and completing the sale.

A suitable method for selling partner protection insurance is illustrated in FIG. 4.

A suitable method for selling partner protection insurance comprises the steps of:
  I. identifying a suitable class of potential defendants and their partners;
  II. obtaining personal information regarding member of said suitable class;
  III. offering to sell said insurance to one or more members of said class;
  IV. obtaining application information from one or more members of said class;
  V. approving a sale of said insurance if said application information meets a predetermined set of criteria; and
  VI. closing said sale of said insurance.

I. Identifying a Suitable Class

A method for identifying a suitable class of potential defendants and their partners is described above. The class of law enforcement officers and their partners is an example of a suitable class.

II. Obtaining Personal Information Regarding Members of said Suitable Class

Personal information regarding the members of a suitable class comprises information that may be used to contact one or more members of said suitable class. Personal information may comprise one or more of name, address, phone number and email address.

Public personal information may be obtained by a partner protection insurance company 400 by querying 414 public information 410.

Private personal information may be obtained by querying 424 one or more private organizations 420. Said private information may be stored in at least one information system 422 that is controlled by said private organization. If a partner protection insurance company has approved access to said information system 422, then private personal information 426 will be transmitted to said insurance company in response to the query 424.

For example, law enforcement officers in the United States belong to a number of private organizations. These organizations include the Fraternal Order of Police, the International Association of Chiefs of Police, the State's Attorney Association, the International Brotherhood of Teamsters (jailers and prison guards), and various County Officials organizations.

A partner protection insurance company may negotiate with a suitable private organization to obtain approval for access to their private information. The private organization, for example, might feel that partner protection insurance would be valuable to their members and might therefore grant access to the private information regarding their members. Said access might be subject to certain constraints as to how the information is to be used, what other entities might have access to it, and what security measures are to be taken to maintain its privacy.

III. Offering to Sell said Insurance

A partner protection insurance company may sell partner protection insurance to a suitable class using a sales entity 430. Said sales entity may be a part of said insurance company, such as a captive sales force, or it may be a separate entity, such as an independent sales agency.

The sales entity may comprise an information system 432. The information system serves to store information, transfer information, and execute software in order to make a sale.

The partner protection insurance company will transmit prospect data 434 to the sales entity. Said prospect data may comprise personal data regarding the members of said suitable class. Said information may be transferred directly from the information system 402 of the partner protection insurance company to the information system 432 of the sales entity. Said information systems may be the same system.

Prospect data may also comprise promotion data, such as sales brochures, promotion software, such as a web page or automated telephone protocols, and policy information, such as the terms of a partner protection plan insurance contract suitable for members of said suitable class.

The sales entity may then use the prospect data to provide sales information 444 to at least one member of said suitable class. Said at least one member might be a potential innocent partner 441 or a potential defendant 442.

Said sales information may comprise one or more of a description of the risk an innocent partner faces, exemplary premiums, an application form for said insurance, and a software means for calculating the assets that can be protected.

Said sales information may be provided via a mailing, email offer, web site posting, personal phone call from a sales agent, automated phone call, TV advertisement or other known means for providing sales information.

Cup O' Conduct

Figure 9:
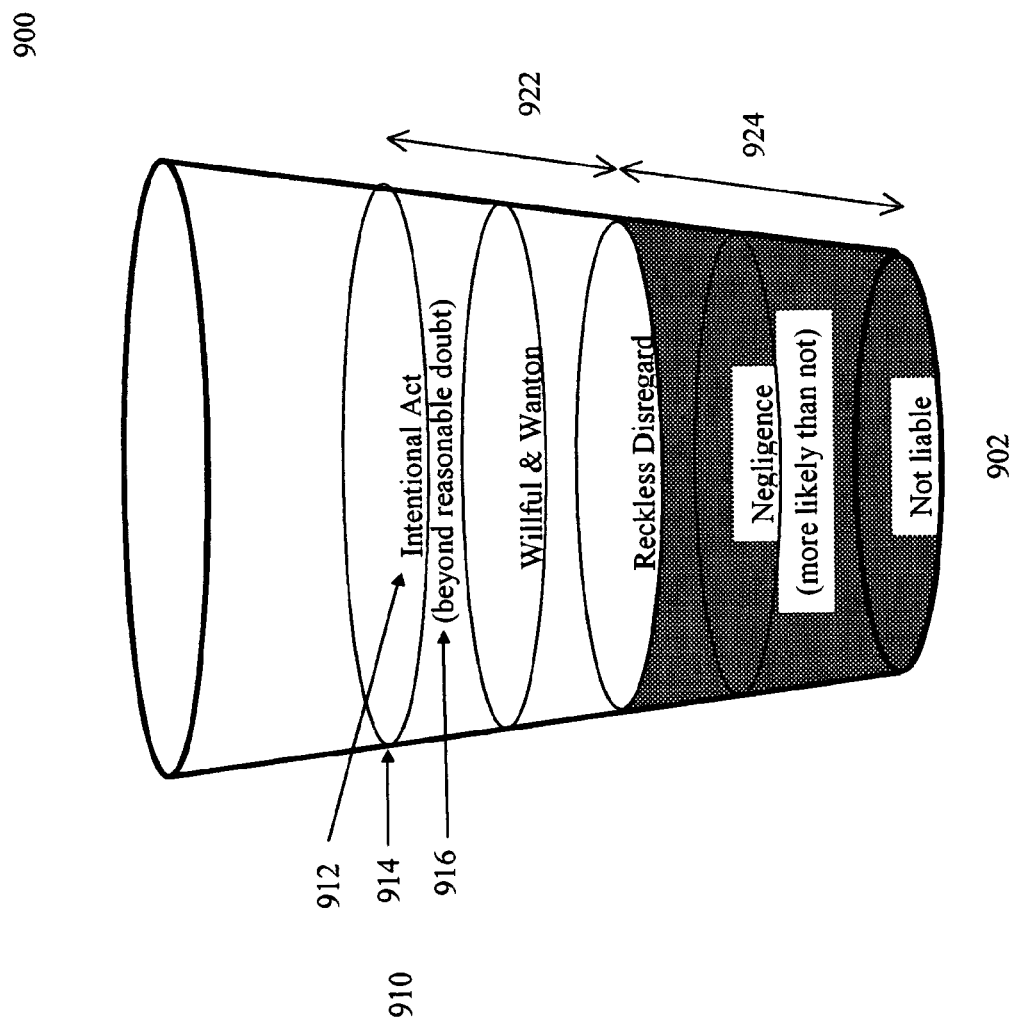
FIG. 9 is an illustration of a Cup O' Conduct.

An inventive means of providing at least a portion of said sales information is referred to herein as a "Cup O' Conduct". A Cup O' Conduct 900 is illustrated in FIG. 9.

A Cup O' Conduct is a representation of the various degrees of exposure to insured and uninsured damages that a potential defendant and a potential innocent partner may be exposed to in the event that a civil lawsuit is brought against said potential defendant.

A Cup O' Conduct comprises a cup 902 and graduations 910. The graduations comprise a label 912 indicating level of intent to cause damages (e.g. "Intentional Act"), optionally a label 916 indicating level of legal proof required to demonstrate said level of intent to cause damages (e.g. "beyond reasonable doubt"), and optionally a line 914.

A Cup O' Conduct may be used to illustrate to a potential defendant and or their potential innocent partner the level of protection their current liability insurance provides and their exposure to uninsured damages. This, in turn, would help illustrate their need for partner protection insurance to cover at least the joint assets assignable to the potential innocent partner.

The amount of damages assessed against a defendant in a civil lawsuit depends upon the intent of the defendant to cause said damages. If the damages cannot be attributed to the action or inaction of the defendant (i.e. "not liable"), then no damages are assessed. If the defendant causes the damages only through their negligence, then a relatively low level of damages are assessed. If the defendant shows intent to cause damages that rises to the levels of "reckless disregard", "Willful & wanton acts" or "intentional acts", then progressively higher levels of damages are assessed.

One can think of the Cup O' Conduct as a representation of the total assets of the potential defendant including their joint assets. The more willful the intent to cause damages, the more of those assets that will be awarded to a plaintiff. In a court proceeding, therefore, a counsel for a plaintiff will attempt to show that the intent was as high as the evidence will support. This maximizes the damages awarded to their client. The counsel for the defendant, however, will endeavor to show that the intent was as low as the evidence will support. This minimizes the damages that will be assessed against their client.

Liability insurance of a potential defendant is only available for levels of intent that rise to a certain level. All States in the United States, for example, will allow the sale of liability insurance to cover intent that is at the negligence level or less. About one half of the states allow the sale of liability insurance to cover intent that is reckless disregard or less. A few States in the United States allow liability insurance to cover intent that is willful & wanton or less. No State in the United States allows liability insurance to cover intent that is intentional.

The level of coverage 924 for a given potential defendant can be illustrated by shading in the walls of the cup. The uninsured level 922 is a different shading. Thus a potential defendant or their innocent partner may readily perceive their exposure to uninsured damages.

A Cup O' Conduct may be a physical cup, such as a measuring cup, coffee cup or drinking glass. If the Cup O' Conduct is a measuring cup, then said graduations may be additionally labeled with units of measure, such as ¼ cup, ½ cup, etc. A Cup O' Conduct may additionally comprise a handle. A Cup O' Conduct may be clear, opaque or tinted. A Cup O' Conduct may be given away as a promotional item. A Cup O' Conduct may additionally comprise a label identifying said sales entity, said partner protection insurance company, and/or their respective contact information.

A Cup O' Conduct may alternatively be represented on a printed page, PowerPoint presentation or a web page.

If a Cup O' Conduct is represented on a web page, the level 924 of current liability coverage of a potential defendant may be represented based on information input into said web page. Said information may comprise the name of the liability insurance company providing said potential defendant's current liability insurance coverage, the state that the potential defendant lives in, and the employer of said potential defendant. Said information may be used by the entity receiving said information to look up the appropriate level of liability insurance coverage in a database and adjust the Cup O' Conduct accordingly.

IV. Obtaining Application Information

If said one or more members of said suitable class wishes to purchase partner protection insurance for a potential innocent partner, then said one or more members provides application information 446 to said sales entity.

Said application information may comprise a description of joint assets and their monetary value, a fraction of said assets that are assignable to said potential innocent partner, information regarding any past or pending civil litigation that a potential defendant may be or may have been involved with and any other information that said insurance company would require in order to calculate a premium or qualify an applicant for said insurance coverage.

Application information may also comprise payment information, such as a credit card number.

Said application information may be transmitted via manual means, such as by filling out a form, or by automated means, such as by entering data into a web site.

V. Approving an Application

In order to approve the sale of a partner protection insurance policy to an applicant, said sales entity 430 transmits approval information 436 to an approval entity, such as the partner protection insurance company 400. Independent approval entities may also be used.

The approval information may comprise at least a portion of the application information.

Said approval entity then compares said approval information against a set of approval criteria to determine what the premium should be for said applicant and whether or not said applicant should be approved for coverage.

Said approval entity may obtain additional information from either public data 410 or private data 420 regarding the eligibility of said applicant. Said additional information might comprise data on whether or not there are or have been any civil cases brought against said potential defendant.

Once a decision is made on whether or not approval is granted, said approval entity transmits decision information 438 to said sales entity which in turn relays offer information 448 to said applicant. Said decision information and said offer information may comprise a benefit level that said applicant qualifies for, a premium required and whether or not the applicant is approved.

VI. Closing the Sale

The applicant then decides whether or not to accept said offer and communicates said decision to said sales entity, thus consummating the sale.

The entire sales process may be automated through a web interface. The applicant may apply, get approval, accept an offer and pay a premium in real time.

Representing an Insured Innocent Partner'S Interests

The present invention provides a number of technology assisted means to assist a partner protection insurance company in defending the financial interests of an insured potential innocent partner. As used herein, "insured potential innocent partner" or simply "insured" means a potential innocent partner that is covered by at least one partner protection insurance policy.

Said technology assisted means include:
1. a means for representing an individual insured innocent partner during civil litigation between a plaintiff and defendant;
2. a means for increasing respect for "demand letters"; and
3. a means for updating "demand letters".

1. Means for Representing an Individual Insured

Figure 5:
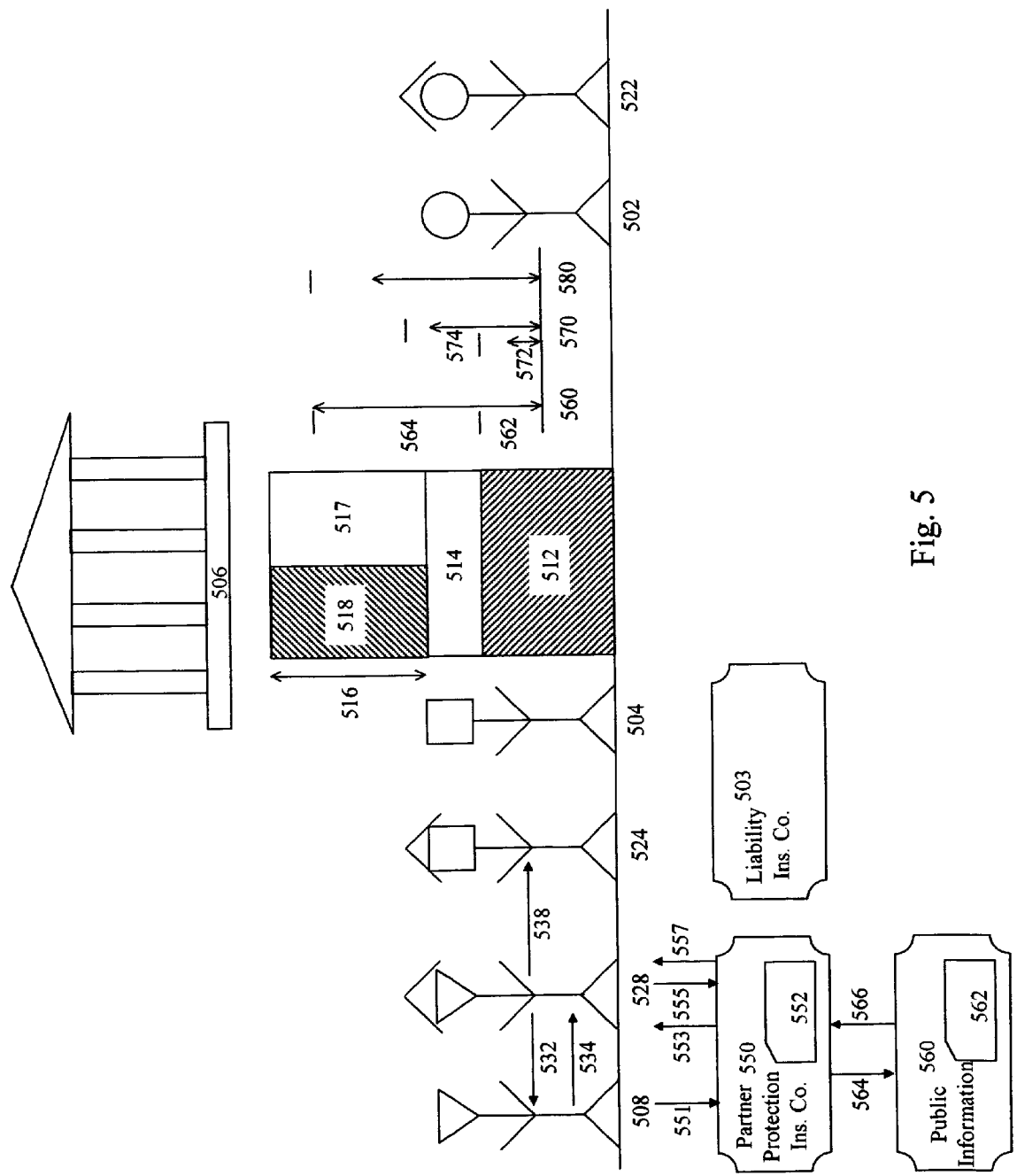
FIG. 5 is an illustration of a method for providing counsel for an innocent partner in a lawsuit between a plaintiff and a defendant.

Refer to FIG. 5 unless otherwise indicated. Solid head arrows in FIG. 5 represent the transfer of information. Open head arrows in FIG. 5 represent monetary quantities.

FIG. 5 illustrates a technology assisted means for representing the interests of an individual insured innocent partner 508 during civil litigation between a plaintiff 502 and defendant 504.

Said innocent partner is a partner of said defendant. Said civil litigation is governed by a given court 506. Said plaintiff is represented by counsel 522 for the plaintiff Said defendant is represented by counsel 524 for the defendant. Said defendant is covered by at least one liability insurance policy provided by a liability insurance company 503.

Said counsel for the defendant is at least in part under the direction of said liability insurance company.

Said plaintiff is demanding damages 560. Said damages comprise insured (by the liability company) damages 562 and uninsured (by the liability company) damages 564.

Said insured innocent partner is covered by a partner protection insurance policy provided by a partner protection insurance company 550. Said partner protection insurance policy covers a fraction 518 of the joint assets 516 that are held by the innocent partner and the defendant. Said partner protection insurance policy provides counsel for the innocent partner in the event that the defendant is sued by the plaintiff.

The technology assisted method for representing the interests of an insured innocent partner comprises the steps of:
I. receiving notification from said innocent partner that a lawsuit has been filed against a defendant, said defendant being a partner of said innocent partner;
II. providing counsel 528 for the innocent partner
III. providing at least demand letters to the counsel 528 for said innocent partner such that said counsel may serve said demand letters upon the counsel 524 for the defendant I. Receiving Notification When a defendant has been served notice that a lawsuit has been filed against them, the insured innocent partner of said defendant is obligated under their partner protection insurance policy to inform said partner protection insurance company or their designee of the existence of said lawsuit with in a certain period of time. A suitable certain period of time may be a week.

Said notification 551 may be made by technology assisted means. For example, the insured innocent partner may log onto a web site hosted by an information system 552, under the control of the partner protection insurance company. The insured innocent partner may be required to enter one or more of their name, their partners name, the plaintiffs name, the court 506, the damages demanded 560, the date the defendant was served, and any other information necessary to assign counsel for said innocent partner.

II. Providing Counsel for the Innocent Partner

Upon receiving notice of said lawsuit, said partner protection insurance company or their designee provides counsel for the innocent partner by selecting and hiring an appropriate attorney 528.

Said selection may be assisted by technological means. For example, said partner protection insurance company may maintain a list of qualified attorneys in various jurisdictions to represent various innocent insureds. Said list may be stored and accessible via an information system 552 under the control of the partner protection insurance company.

The step of proving said attorney may comprise one or more of the steps of:
a. said information system 552 accessing a lookup table of said qualified attorneys and the jurisdictions they are suitable for;
b. assigning one of said attorneys to represent said innocent insured based on the jurisdiction information provided in the notification information 551;
c. notifying 553 said assigned attorney by technological means, such as email; and
d. providing 553 to said attorney at least the contact information for said innocent insured.

Said qualified attorneys may be under contract with said partner protection insurance company. Said contract may stipulate that said attorneys will represent said innocent insureds for a fixed fee. Said fixed fee may be in the range of $1,000 to $3,000.

All monetary values used herein are in US dollars as of Jan. 15, 2004. Equivalent monetary values in other currencies and at other times may be calculated using published exchange rates and inflation factors.

Corresponding monetary values in jurisdictions outside of the US may be derived by taking into account local market rates for various components of said monetary values. For example, if the market rate for attorneys in a given jurisdiction is substantially less than that of US attorneys, said range of attorney fixed fees may be proportionally smaller.

The ability of said partner protection insurance company to negotiate a fixed fee with one or more attorneys is in part due to the technology assisted means for representing an innocent insured as described herein.

Upon notification that said attorney has been assigned to represent said innocent partner, said attorney for said innocent partner contacts 532 said innocent partner and obtains any additional information 534 necessary to represent said innocent partner. Said information may then be subsequently submitted to said partner protection insurance company and entered into their information system 552.

As used herein, information transferred to or from an attorney or other person may mean that information is transferred to or from an information system under the control of said attorney or other person.

Said counsel for said innocent partner then notifies all parties involved in said lawsuit that said same counsel is representing the interests of the innocent partner. Said all parties comprise the counsel for the defendant, the counsel for the plaintiff and the court.

The counsel for the innocent partner also demands to be put on the "service list" of said lawsuit. Hence the counsel for the innocent partner is automatically sent copies of all filings and notifications made by the different parties to the lawsuit. The step of said demanding to be put on the service list and the subsequent sending of copies of all filings and notifications may be automated using one or more information systems.

III. Providing at Least Demand Letters

The counsel for the innocent partner will represent the interests of the innocent partner at least in part by sending 538 "demand letters" to the counsel for the defendant. Exemplary demand letters are shown in FIGS. 6, 7 and 8. A demand letter informs the counsel for the defendant that the assets 518 of the innocent insured are at risk due to the lawsuit. It further demands that the counsel for the defendant fully represent the interests of the innocent insured at least to the degree that said counsel for the defendant represent the interests of the defendant and the interests of the liability insurance company 503. In many jurisdictions in the United States, the counsel for the defendant is obligated by law to represent the interests of an innocent partner to said degree. This obligation is known as an innocent partner's "rights of subrogation".

The demand letter may also demand that the counsel for the defendant offer to settle the lawsuit for an amount up to the limits of liability 512 of the liability insurance coverage provided by the liability insurance company.

If the counsel for the defendant and the liability insurance company respect said demand letter, then they may increase an initial offer 570 to settle said lawsuit from a value 572 that was less than their exposure 562 to insured damages to a higher value 574 that is less than their limit of liability 512. This higher offer may be close enough to an earlier offer 580 by the plaintiff in order for the counsel for the plaintiff to negotiate a settlement.

If the case is settled, then the liability insurance company will pay the settlement and the innocent partner will not lose any assets.

If the case is not settled but instead results in a final judgment by the court and if the uninsured damages 564 are greater than the personal assets 514 of the defendant, then at least some of the damages will be paid out of the joint assets of the defendant and the innocent partner.

The innocent partner will then make a claim against their partner protection insurance coverage in the amount of the fraction of the damages assignable to said same innocent partner. The partner protection insurance company would then pay a benefit in order to reimburse the innocent partner for said fraction of the damages.

The partner protection insurance company would not reimburse the defendant for any of the defendant's share 517 of the joint assets required to pay the damages.

The step of providing at least one demand letter to the counsel for the defendant may be assisted by technological means. For example, said partner protection insurance company or its designee might maintain a database of demand letters in its information system 552. When an attorney for an innocent insured needs a demand letter, then said same attorney would submit a demand query 555 to said information system and receive a response 557 comprising an appropriate demand letter. Said demand letter would have at least some of and preferably all of the information necessary to send said demand letter directly to the counsel 524 for a defendant. Said demand letter would also preferably have the particular form and content required by the court 506.

A demand query 555 may comprise notification of a particular event. Said particular event could trigger the automatic sending of an appropriate demand letter to said counsel for the defendant along with copies to all other parties on a service list.

An example of a particular event is the rendering by the court of a final judgment of damages in the lawsuit. In certain jurisdictions, there is a limited time, such as 10 days, in which either the defendant or the plaintiff can file an appeal to the court's final judgment. This may be an opportune time for the plaintiff and the defendant to settle the case and thus avoid the cost and uncertainty of an appeal. Hence this is also a good time for the counsel for the innocent partner to present a demand letter to the counsel for the defendant, thus reminding the counsel for the defendant of his/her obligation to represent the financial interests of the innocent insured in the settlement negotiations.

Another example of a particular event is any event that occurs to the defendant, the innocent partner, or one or more of their dependants that would be impacted by the ongoing lawsuit. Said events include:

- onset or diagnosis of a severe illness for either said defendant, said innocent partner or one or more of their dependants;
- application by said defendant or innocent partner for a job or other position that requires reporting of any pending litigation; or
- death of said defendant or innocent partner.

The occurrence of any of these events would increase the need of the innocent partner for settlement of said pending lawsuit. Hence the transmittal of one of said demand letters would be appropriate.

Exemplary Demand Letters

FIGS. 6, 7 and 8 illustrate exemplary demand letters that may be generated by above described automated means. FIG. 6 illustrates a demand letter that is suitable for an initial communication between a counsel for an innocent partner and a counsel for a defendant. FIG. 7 illustrates a demand letter that is suitable for communication from said counsel for said innocent partner to said counsel for said defendant in the event an offer to settle a given case is made by the counsel for the plaintiff. FIG. 8 illustrates a demand letter that is suitable for communication from said counsel for said innocent partner to said counsel for said defendant in the event that the court renders a judgment in the case.

For FIGS. 6, 7 and 8, text in boxes and arrows identify various elements of a given figure. They do not form part of the invention.

Referring to FIG. 6, a demand letter suitable for an initial communication between a counsel for an innocent partner and the counsel for the defendant comprises a header 602, body 604 and signature 606.

Said header, body and signature comprise one or more fields. Said fields are indicated by square brackets. The labels for a given field are indicated in capital letters within a given set of square brackets. For example,

[NAME OF COUNSEL FOR INNOCENT PARTNER]

Represents the field named "Name of Counsel for Innocent Partner". The field names are self-explanatory.

When a counsel for an innocent partner submits a request for a given demand letter to an information system, said information system may automatically generate said demand letter by looking up the value of each field in a data base and substituting said values in said demand letter. Software suitable for said looking up and substituting includes Microsoft Word®. (Microsoft Word® is a trademark of Microsoft Corporation of Redmond, Wash.)

Referring to FIGS. 7 and 8, the demand letters illustrated therein similarly comprise headers 702 and 802, bodies 704 and 804 and signatures 706 and 806.

Data for the field [SIGNATURE OF COUNSEL FOR INNOCENT PARTNER] may comprise a graphic file of the signature of the counsel for the innocent partner. Said data may also comprise an electronic signature.

Providing demand letters is a large fraction of the service that the counsel for the innocent partner provides to an innocent partner during litigation. By automating said providing of demand letters, the cost of said service can be kept low and hence a partner protection insurance company is more likely to be able to negotiate fixed fees for said service.

2. Increasing Respect for Demand Letters

A strategy for increasing the respect for demand letters by liability insurance companies comprises a partner protection insurance company suing a liability insurance company if said liability insurance company inhibits a counsel for a defendant from acting according to a demand letter served during a given lawsuit.

Demand letters provide a discoverable record that a counsel for the defense has been given notice that said same counsel for the defense has a legal obligation to represent the financial interests of an insured innocent partner at least to the extent that said same counsel represent the interests of a liability insurance company during litigation. If a liability insurance company instructs a counsel for the defendant to ignore a demand letter, then the partner protection insurance company has a cause for action against the liability insurance company.

A partner protection insurance company may retain a counsel to represent said same partner protection insurance company in a case brought against a liability insurance company. Said counsel may be the same counsel that the partner protection insurance company assigned to represent the insured innocent partner in the corresponding earlier case between a plaintiff and defendant. The damages sought by the partner protection insurance company would include the benefits paid to an insured innocent partner from the earlier case.

The counsel retained by the partner protection insurance company may be retained on a contingency basis. Said contingency might be 50% of any award or settlement up to a given limit. A suitable given limit may be $20,000.

By providing a technologically assisted means for providing demand letters during civil litigation between a plaintiff and a defendant, a partner protection insurance company increases the chance of success of subsequent litigation against a liability insurance company for failure to heed said demand letters.

Over time, the success of litigation against liability insurance companies for failure to heed demand letters will increase said same liability insurance companies' respect for demand letters and hence increase the chances of settlement in civil litigation between a plaintiff and defendant.

3. Updating Demand Letters

A partner protection insurance company may update a set of demand letters. Said updating may be assisted by technological means. Said updating may be performed periodically.

For example, referring back to FIG. 5, a partner protection plan insurance company or their designee may submit legal queries 564 to public information 560. Said public information may reside in the form of databases on an at least one information system 562. Said legal queries might be keyword searches of public databases such as LexisNexis® (www.lexisnexis.com, last viewed on Dec. 14, 2004) (LexisNexis® is a trademark of Reed Elsevier Group, of London England). Said keyword searches might include the phrases:

"demand to settle";

"insurance bad faith";

"assignment of action for bad faith dealings"; or synonyms, equivalents, portions thereof, or Boolean combinations thereof.

Said public information system 562 may provide legal information 566 in response to said queries. Said legal information may comprise recently passed legislation and court decisions. Said information may be reviewed by said partner protection insurance company to determine how demand letters in given jurisdictions need to be updated. A database of said demand letters residing on or accessible to said insurance company information system 552 could then be updated and hence kept current.

A suitable frequency for updating demand letters may be in the range of once per day to once every 60 days. A frequency of once per week should be suitable given the frequency of changes in legal requirements for demand letters in the United States. A frequency of up to 60 days may be suitable due to the common practice of providing 60 days notice between when legislation is passed and when it goes into effect. Frequencies of at least once per day may be suitable since some legislation is effective immediately upon passage.

A similar process of updating may be used for updating the legal requirements for partner protection plan policy forms or the allowable fractions of joint assets that may be assigned to a potential innocent partner. Suitable keyword searches include the phrases:

"punitive damages insurance";

"innocent spouse";

"innocent partner"; or synonyms, equivalents, or portions thereof, or Boolean combinations thereof.

Example 1

Specific embodiments of the present invention are illustrated by the following example and subsequent examples. This example and other examples are not meant to be limiting.

A suitable class of potential defendants is police. Partner protection insurance company, $P^2$, offers partner protection insurance to a set of said police and their potential innocent partners (e.g. spouses) through a private organization they belong to, The Fraternal Order of Police. The governing body of the Fraternal Order of Police endorses said insurance as being in the best interests of their members. Hence they make a private mailing list of members available to the $P^2$ Insurance Company.

The $P^2$ Insurance Company determines that a suitable premium for said insurance would be $180 per year for $100,000 worth of coverage. This estimated premium is based on the frequency of civil litigation against the members of the Fraternal Order of Police, the average uninsured punitive damage awards, and the average income of the members.

The partner protection insurance company conducts a focus group of potential innocent partners of said members and determines that said insurance would be desirable if it also comprised mandatory training of their partners who are potential defendants in how to minimize the probability that they will be named as a defendant in a lawsuit brought by a plaintiff.

The partner protection insurance company adds this feature to the partner protection insurance policy and increases the premium by $5 per year to $195 per year.

The partner protection insurance company conducts a subsequent focus group of potential defendants and determines that said insurance policy would be desirable if it also comprised mandatory training of potential innocent partners on how to protect their joint assets if a potential defendant is named in a lawsuit.

The partner protection insurance company adds said feature to the partner protection insurance policy and increases the premium by another $5 per year to $200 per year.

The partner protection insurance company then conducts a telephone survey of a random sampling of said members and determines that 33% of said members would buy said insurance if the cost were "about the cost of a cup of coffee a day". A cup of coffee costs a $1 and there are about 250 working days in a year. Hence "about a cup of coffee a day" corresponds to a premium of $250 per year. The $P^2$ Insurance Company, therefore, conservatively projects that 33% of the members of the Fraternal Order of Police will purchase partner protection insurance.

There are about 300,000 members of the Fraternal Order of Police as of Dec. 14, 2004 (see www.grandlodgefop.com, last viewed Dec. 14, 2004). If 33% of said members purchase said insurance, then the anticipated premium income would be $20,000,000 per year (100,000 members purchasing insurance times $200 premium per year per member). This exceeds the threshold of $1,000,000 per year required to make an offering to a suitable class. $P^2$ Insurance Company, therefore, decides to sell partner protection insurance to the suitable class of members of the Fraternal Order of Police.

The partner protection insurance company contracts with the ABC insurance agency as a sales entity to sell partner protection insurance to the members of the Fraternal Order of Police. They transfer private information comprising a list of members including their phone numbers, addresses, email addresses and partners from their information system to the information system of the ABC insurance agency. Said private information was obtained from the information system of the Fraternal Order of Police upon approval of their governing body.

ABC insurance agency sends a direct mail promotion to said members. Said promotion comprises a print advertisement, a first Cup O' Conduct in the form of a travel coffee mug and a second Cup O' Conduct in the form of a baking measuring cup.

Said advertisement comprises an endorsement of said insurance by the Fraternal Order of Police. Said advertisement also directs members to log onto the ABC web site to learn more about said insurance.

The ABC web site comprises information about said insurance, a calculator for determining required coverage, an application form and automated PayPal® means for accepting credit card payment. (www.paypal.com, last viewed Dec. 15, 2004) (PayPal® is a registered trademark of eBay, Inc. San Jose, Calif.)

Said application form requires information necessary to qualify an applicant for said insurance. Said information comprises:
  Name of person seeking coverage;
  Name of partner of said person seeking coverage;
  Affirmative statement of partnership relationship (e.g. married, committed life partnership, relative who has co-mingled assets, professional skill partner (e.g. doctor, attorney, accountant));
  Amount, type and dollar value of assets;
  Address;
  Organization, company or entity from which punitive damages might arise; and
  List of any prior or pending lawsuits brought against said partner and whether or not any uninsured damages were assessed against said partner.

Upon receiving said application information from an applicant, the system running said web site automatically checks the validity of at least some of said information by querying records of lawsuits, addresses, etc. If said at least some of said information is verified, then the applicant is automatically approved and is directed to a web page whereby they may confirm their purchase of said insurance.

Example 2

On Jan. 10, 2004, Mary Smith, wife of Patrolman John Smith, purchases partner protection plan insurance from $P^2$ insurance company or a term of one year. They pay a premium of $200. Their limit of coverage is $100,000.

Patrolman John Smith is covered by a general liability insurance policy provided by $L^3$ Insurance Company.

Patrolman Jim Jones works with patrolman John Smith. Patrolman Jim Jones is also covered by a general liability insurance policy provided by $L^3$ Insurance Company.

Patrolman Jim Jones has a wife, Jane Jones who is not covered by a partner protection insurance policy.

Both families are residents of the State of Illinois. Both officers serve in the State of Illinois.

On Jan. 12, 2004, Patrolman Smith, while on duty, observes patrolman Jones unnecessarily strike a motorist they had stopped for a traffic violation.

On Feb. 10, 2004, a two-count lawsuit is filed by said motorist in US Federal Court. The lawsuit alleges civil rights violations by both Patrolman Smith and Patrolman Jones. Count I alleges negligent action on the part of both officers and seeks in excess of $5,000 in compensatory damages.

Count II alleges intentional action on the part of both officers and seeks $400,000 in punitive damages. The compensatory damages are insured damages per the liability insurance policies in force on Patrolman Smith and Patrolman Jones. The punitive damages are uninsured damages because they are not covered by the liability insurance policies in force on Patrolman Smith and Patrolman Jones.

On Feb. 15, 2004, both officers write to the $L^3$ Insurance Company demanding that a defense be provided and indemnification be provided for both counts of the complaint.

Meanwhile, Mrs. Smith logs onto a claims web site provided by the $P^2$ Insurance Company and notifies them that a lawsuit alleging uninsured damages has been brought against her husband. She provides the name of the plaintiff and the court which has jurisdiction over the case.

The information system running said web site identifies attorney Ms. P from a list of suitable attorneys under contract. Ms. P is automatically informed of her representation of Mrs. Smith and is provided with contact information for her. Ms. P then notifies all appropriate parties in the lawsuit of her representation of Mrs. Smith and demands to be placed on the service list.

On Mar. 25, 2004, the $L^3$ Insurance Company writes a letter to both officers explaining how it plans to proceed. In a Reservation of Rights letter, the company explains that damages resulting from negligent acts are covered. Damages resulting from intentional acts are not covered. However, Illinois requires all counts to be defended if there is coverage for only one. Payment for the defense of the non-covered counts can be sought by the $L^3$ Insurance Company from both officers. The company states that they will seek this reimbursement after the conclusion of the underlying case. The company states that an attorney, Mr. L, has been hired to defend both of them. They are told they must cooperate with this attorney or lose their general liability coverage.

On Apr. 2, 2004, the plaintiff (i.e. said motorist) makes an offer to settle the case for $200,000.

On Apr. 2, 2004, upon notification of the offer, Ms P, the attorney for Mrs. Smith, inputs information about the offer into the information system of the $P^2$ Insurance Company. The $P^2$ Insurance Company immediately provides an electronic copy of a demand letter suitable for email delivery to the attorney for the defendant, Mr. Smith. Ms P reviews said demand letter and forwards it to the attorney for Mr. Smith.

The demand letter demands that the attorney for Mr. Smith and the $L^3$ Insurance Company settle the case to protect the interests of Mrs. Smith, an innocent party to the event.

The $L^3$ Insurance Company ignores the demand letter and offers no more than $5,000 (i.e. the compensatory damages asked for) to settle the case. The case is not settled and it goes to trial.

On Apr. 1, 2005 the jury awards $235 in compensatory damages to the motorist for the emergency room bill, and $50,000 in punitive damages against each officer.

The $L^3$ Insurance Company pays the $235 compensatory judgments to the motorist.

Each officer also pays their $50,000 punitive judgment to the motorist. Each officer makes payment from a joint bank account that each has with his respective spouse.

Mrs. Smith, the insured innocent partner, submits a claim to the $P^2$ Insurance Company for her share (i.e. $25,000) of the damages paid by her husband from the joint account. The $P^2$ Insurance Company reimburses Mrs. Smith $25,000 for her share.

Mrs. Jones cannot recover her share, since she has no partner protection insurance.

Example 3

Upon conclusion of the civil litigation between the motorist and the officers of Example 2, the $P^2$ Insurance Company sues the $L^3$ Insurance Company for failure to properly represent the interests of Mrs. Smith, the insured innocent partner. The $P^2$ Insurance Company retains Ms. P to represent them on a contingency fee basis. Ms. P is to get 50% of any damages collected, up to a limit of $20,000. The $P^2$ Insurance Company seeks $25,000 in damages.

During electronic discovery, attorney Ms. P produces records of the demand letter she sent to the attorney for Mr. Smith in said prior lawsuit. The $L^3$ Insurance Company realizes that the P2 Insurance Company has a strong case and seeks to settle. The $P^2$ Insurance Company and the $L^3$ Insurance Company then negotiate and settle the case for $15,000. Attorney Ms. P retains $7,500 of the settlement as her contingency fee.

Thereafter, the general counsel for the $L^3$ Insurance Company instructs her staff that all future demand letters sent by attorneys under the employ of the $P^2$ Insurance Company are to be respected.

Insurance Regulation

One of skill in the art will recognize that insurance is a regulated industry. One practicing the methods described and claimed herein will want to maintain compliance with all applicable local, state and federal regulations, to ensure that an insurance policy is properly presented to the insured, premiums are properly approved, underwriting properly occurs, all necessary regulatory approvals are in place, etc.

While particular embodiments of the present invention have been illustrated and described, it would be obvious to those skilled in the art that various other changes and modifications can be made without departing from the spirit and scope of the invention. Any of the aspects of the present invention found to offer advantages over the state of the art may be used separately or in any suitable combination to achieve some or all of the benefits of the invention disclosed herein.

We claim:

1. A method for providing a benefit payable to an innocent partner insured by a partner protection insurance policy, said innocent partner being in a partnership with a defendant, said defendant having to pay uninsured damages to a plaintiff due to a judgment against said defendant in a court proceeding wherein said defendant was a named defendant in said proceeding, said method comprising the steps of:
   a) receiving in a computer system an insurance claim against said partner protection insurance policy covering said innocent partner, said partner protection insurance policy comprising an exclusion whereby no claim will be paid if said insured innocent partner is also a named defendant in said court proceeding;
   b) determining an amount of said uninsured damages payable from the joint assets of said partnership;
   c) determining a fraction of said joint assets assignable to said innocent partner in the event of the dissolution of said partnership, said dissolution being governed by the laws and legal precedents of a State;
   d) calculating said benefit by multiplying said amount of said uninsured damages payable from said joint assets by said fraction; and
   e) paying said benefit to said innocent partner,
      wherein said step of determining said fraction of said joint assets assignable to said innocent partner is performed on a computer system specifically modified to automatically determine said fraction according to the requirements of said laws and said legal precedents of said State.

2. The method of claim 1 wherein said partnership is at least one of:
i. a marriage;
ii. a committed life partnership;
iii. a family; or
iv. a professional partnership.

3. The method of claim 1 wherein said fraction is in the range of about 40% to about 60%.

4. The method of claim 1 wherein said fraction is about 50%.

5. The method of claim 1 wherein said fraction is either less than about 40% or greater than about 60% and wherein said fraction is in accordance with the laws and legal precedents governing the assignment of said joint assets to said innocent partner upon the dissolution of said partnership.

6. The method of claim 1 wherein the step of determining said fraction further comprises the steps of:

i. submitting one or more legal queries to public information; and
ii. receiving legal information in response to said one or more queries, wherein said legal information is relevant to laws or legal precedents governing to the assignment of assets in the event of a dissolution of a partnership.

7. The method of claim 6 wherein said one or more legal queries comprise one or more keyword searches and wherein said one or more keyword searches comprises one or more of the phrases:
i. "punitive damages insurance";
ii. "innocent spouse";
iii. "innocent partner"; or
synonyms, equivalents, or portions thereof or Boolean combinations thereof.

8. The method of claim 6 wherein said submitting of one or more legal queries is performed at a frequency of between once per day to once per sixty days.

* * * * *